United States Patent
Baker et al.

(10) Patent No.: US 10,585,852 B2
(45) Date of Patent: *Mar. 10, 2020

(54) MECHANISM FOR FACILITATING EVALUATION OF DATA TYPES FOR DYNAMIC LIGHTWEIGHT OBJECTS IN AN ON-DEMAND SERVICES ENVIRONMENT

(71) Applicant: salesforce.com, inc., San Francisco, CA (US)

(72) Inventors: Gary Baker, South Lake Tahoe, CA (US); Sonali Thomas Agrawal, San Carlos, CA (US); James Ferguson, San Francisco, CA (US); Frank Lopez, San Francisco, CA (US); Jamie No, Lynnwood, WA (US)

(73) Assignee: salesforce.com, inc., San Francisco, CA (US)

(*) Notice: Subject to any disclaimer, the term of this patent is extended or adjusted under 35 U.S.C. 154(b) by 635 days.

This patent is subject to a terminal disclaimer.

(21) Appl. No.: 15/164,461

(22) Filed: May 25, 2016

(65) Prior Publication Data

US 2016/0266876 A1    Sep. 15, 2016

Related U.S. Application Data

(63) Continuation of application No. 14/672,314, filed on Mar. 30, 2015, now Pat. No. 9,465,806, which is a (Continued)

(51) Int. Cl.
*G06F 16/13* (2019.01)
*G06F 16/35* (2019.01)
*G06F 8/30* (2018.01)

(52) U.S. Cl.
CPC ............... *G06F 16/13* (2019.01); *G06F 8/30* (2013.01); *G06F 16/35* (2019.01)

(58) Field of Classification Search
None
See application file for complete search history.

(56) References Cited

U.S. PATENT DOCUMENTS 5,577,188 A    11/1996    Zhu
5,608,872 A    3/1997    Schwartz et al.
(Continued)

OTHER PUBLICATIONS

Non-Final Office Action for U.S. Appl. No. 13/691,452 dated Jul. 8, 2014, 11 pages.
(Continued)

*Primary Examiner* — Wilson Lee
(74) *Attorney, Agent, or Firm* — Jaffery, Watson, Mendonsa & Hamilton, LLP

(57) ABSTRACT

In accordance with embodiments, there are provided mechanisms and methods for facilitating evaluation of data types for dynamic lightweight objects in an on-demand services environment. In one embodiment and by way of example, a method includes uploading a data file having data at a first computing device in response to a request, and detecting data types relating to the data within the data file. The detecting includes scanning data rows and data columns of the data file. The method may further include classifying the detected data types into one or more categories, and creating one or more dynamic objects based on the one or more categories.

20 Claims, 9 Drawing Sheets

US 10,585,852 B2
Page 2

Related U.S. Application Data continuation of application No. 13/691,452, filed on Nov. 30, 2012, now Pat. No. 8,996,569.

(60) Provisional application No. 61/625,746, filed on Apr. 18, 2012, provisional application No. 61/639,157, filed on Apr. 27, 2012, provisional application No. 61/640,476, filed on Apr. 30, 2012, provisional application No. 61/640,483, filed on Apr. 30, 2012, provisional application No. 61/640,487, filed on Apr. 30, 2012, provisional application No. 61/640,495, filed on Apr. 30, 2012.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,507,848 B1 | 1/2003 | Crosby et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,654,947 B1 | 11/2003 | North et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,964 B1* | 10/2007 | Bowman-Amuah ........................ G06F 9/5038 705/1.1 |
| 7,289,976 B2 | 10/2007 | Kihneman et al. |
| 7,340,411 B2 | 3/2008 | Cook |
| 7,620,655 B2 | 11/2009 | Larsson et al. |
| 8,560,494 B1 | 10/2013 | Downing et al. |
| 8,996,569 B2* | 3/2015 | Baker ...................... G06F 8/30 707/771 |
| 9,105,003 B2* | 8/2015 | Berichon ............... G06Q 10/06 |
| 9,465,806 B2* | 10/2016 | Baker ...................... G06F 8/30 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0073236 A1 | 6/2002 | Helgeson et al. |
| 2002/0082892 A1 | 6/2002 | Raffel et al. |
| 2002/0082953 A1* | 6/2002 | Batham ............... G06F 17/3089 705/26.62 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0058277 A1* | 3/2003 | Bowman-Amuah ........................ G06F 17/30607 715/765 |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0150908 A1* | 8/2003 | Pokorny ............... B23Q 35/12 235/375 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229529 A1 | 12/2003 | Mui et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0111270 A1 | 6/2004 | Whitham |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267595 A1* | 12/2004 | Woodings ............... G06Q 10/06 705/7.14 |
| 2004/0268299 A1 | 12/2004 | Lei et al. |
| 2005/0050555 A1 | 3/2005 | Exley et al. |

(56) References Cited

U.S. PATENT DOCUMENTS

| | | | |
|---|---|---|---|
| 2005/0053301 A1 | 3/2005 | Chui et al. | |
| 2005/0091098 A1 | 4/2005 | Brodersen et al. | |
| 2006/0265508 A1 | 11/2006 | Angel et al. | |
| 2007/0061487 A1* | 3/2007 | Moore | G06F 17/30575 709/246 |
| 2007/0099161 A1 | 5/2007 | Krebs et al. | |
| 2007/0185909 A1 | 8/2007 | Klein et al. | |
| 2007/0230486 A1* | 10/2007 | Zafirov | H04L 43/12 370/401 |
| 2007/0266050 A1 | 11/2007 | Kaandorp | |
| 2008/0033802 A1 | 2/2008 | McKenna et al. | |
| 2008/0281792 A1* | 11/2008 | Pickett | G06F 17/30179 |
| 2009/0106234 A1 | 4/2009 | Siedlecki et al. | |
| 2009/0177744 A1 | 7/2009 | Marlow et al. | |
| 2009/0187604 A1 | 7/2009 | Guo et al. | |
| 2009/0287737 A1* | 11/2009 | Hammerly | G06F 17/30604 |
| 2010/0281135 A1 | 11/2010 | Cohn et al. | |
| 2012/0232910 A1 | 9/2012 | Dressler et al. | |

OTHER PUBLICATIONS

Non-Final Office Action for U.S. Appl. No. 14/672,314 dated Oct. 8, 2015, 7 pages.
Notice of Allowance for U.S. Appl. No. 13/691,452 dated Nov. 24, 2014, 10 pages.
Notice of Allowance for U.S. Appl. No. 14/672,314 dated Feb. 12, 2016, 7 pages.

* cited by examiner

MECHANISM FOR FACILITATING EVALUATION OF DATA TYPES FOR DYNAMIC LIGHTWEIGHT OBJECTS IN AN ON-DEMAND SERVICES ENVIRONMENT

CLAIM OF PRIORITY

This application is a continuation application of U.S. patent application Ser. No. 14/672,314, entitled MECHANISM FOR FACILITATING EVALUATION OF DATA TYPES FOR DYNAMIC LIGHTWEIGHT OBJECTS IN AN ON-DEMAND SERVICES ENVIRONMENT, by Gary Baker, et al., filed Mar. 30, 2015, now allowed, which is a continuation application of U.S. patent application Ser. No. 13/691,452, entitled "MECHANISM FOR FACILITATING EVALUATION OF DATA TYPES FOR DYNAMIC LIGHTWEIGHT OBJECTS IN AN ON-DEMAND SERVICES ENVIRONMENT", by Gary Baker, et al., filed Nov. 30, 2012, now issued as U.S. Pat. No. 8,996,569, which claims the benefit of and priority to U.S. Provisional Patent Application No. 61/625,746, entitled "METHODS AND SYSTEMS FOR CREATING LIGHTWEIGHT CUSTOM OBJECTS IN AN ON-DEMAND SERVICES ENVIRONMENT" by Gary Baker, filed Apr. 18, 2012, and U.S. Provisional Patent Application No. 61/639,157, entitled "METHODS AND SYSTEMS FOR EVALUATING A DATA TYPE IN A LIGHT-WEIGHT CUSTOM OBJECT" by Gary Baker, et al., filed Apr. 27, 2012, and U.S. Provisional Patent Application No. 61/640,476, entitled "METHODS AND SYSTEMS FOR EFFICIENT UPLOADING OF OBJECT DATA" by Gary Baker, et al., filed Apr. 30, 2012, and U.S. Provisional Patent Application No. 61/640,483, entitled "METHODS AND SYSTEMS FOR CREATING A TABLE" by Gary Baker, et al., filed Apr. 30, 2012, and U.S. Provisional Patent Application No. 61/640,487, entitled "METHODS AND SYSTEMS FOR CREATING A TABLE FROM A REPORT" by Gary Baker, et al., filed Apr. 30, 2012, and U.S. Provisional Patent Application No. 61/640,495, entitled "METHODS AND SYSTEMS FOR UPDATING A TABLE" by Frank Lopez, filed Apr. 30, 2012, the entire contents of all are incorporated herein by reference and the benefit of and priority to all is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating evaluation of data types for dynamic lightweight objects in an on-demand services environment.

BACKGROUND

Even with the growing use of databases, social network websites, etc., entities or objects offered by service providers are limited to a service provider's default entities and thus do not extend their users (e.g., customers of service providers, etc.) any significant level of customization control over their databases, tables, reports, files, etc.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Methods and systems are provided for facilitating evaluation of data types for dynamic lightweight objects in an on-demand services environment. In one embodiment and by way of example, a method includes uploading a data file having data at a first computing device in response to a request, and detecting data types relating to the data within the data file. The detecting includes scanning data rows and data columns of the data file. The method may further include classifying the detected data types into one or more categories, and creating one or more dynamic objects based on the one or more categories.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for facilitating evaluation of data types for dynamic lightweight objects in an on-demand services environment will be described with reference to example embodiments.

Figure 1:
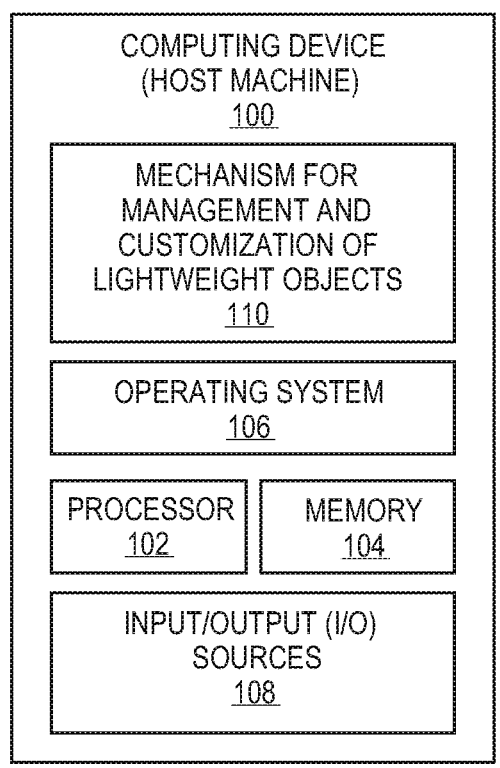
FIG. 1 illustrates a computing device employing a mechanism for facilitating management and customization of lightweight objects according to one embodiment.

FIG. 1 illustrates a computing device 100 employing a mechanism for facilitating management and customization of lightweight objects ("dynamic objects mechanism") 110 according to one embodiment. In one embodiment, computing device 100 serves as a host machine employing dynamic objects mechanism 110 for providing dynamic creation and management of lightweight objects for facilitating user-control of customization of user data as desired or necessitated by a user (e.g., a company, a corporation, an organization, a business, an agency, an institution, etc.). The user refers to a customer of a service provider (e.g., Salesforce-.com) that provides and manages dynamic objects mechanism 110 at a host machine, such as computing device 100.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document.

Figure 2:
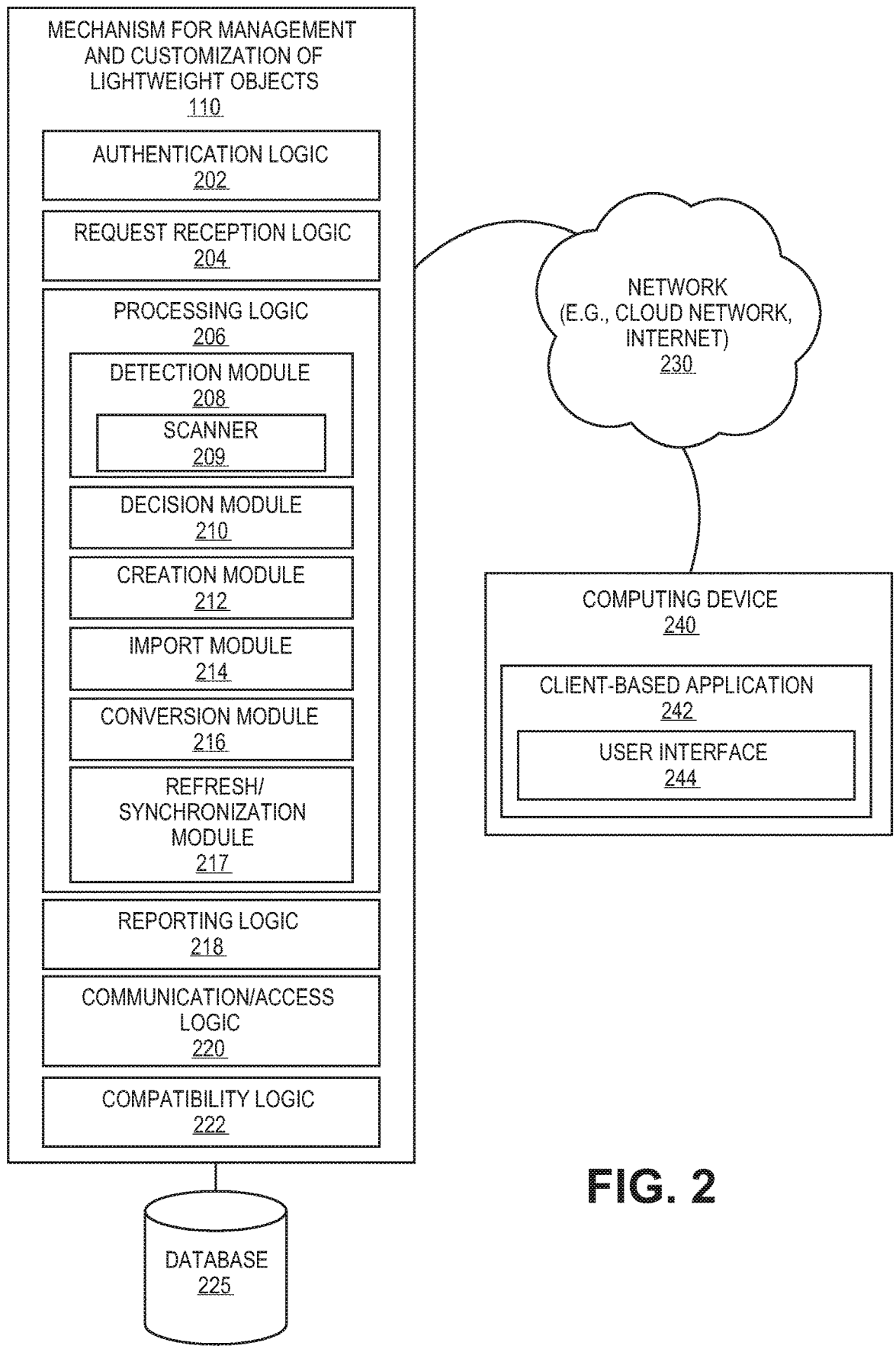
FIG. 2 illustrates a mechanism for facilitating management and customization of dynamic lightweight objects according to one embodiment.

FIG. 2 illustrates a mechanism for facilitating management and customization of dynamic lightweight objects 110 according to one embodiment. In one embodiment, dynamic objects mechanism 110 provides an infrastructure to support a larger than conventional to unlimited number of lightweight objects or entities (also referred to as "tables", "new objects", "custom objects", "dynamic custom objects", "dynamic objects", "my custom objects" or simply "MCOs") per tenant in a multi-tenant database for user-controlled customization of data and its presentation, while conventional objects or entities may be further referred to as "default objects", "administered custom objects", "administered objects", "default objects", "traditional objects", etc. For example, lightweight objects may be allowed to use larger identifier (ID) space (e.g., 15 chars) than the more conventional keyprefix space (e.g., 3 chars) to differentiate custom data by type and support an unlimited number of lightweight objects per tenant (as opposed to the default or administered objects that have a limited namespace of, for example, about 4000 types and an artificial limit to, for example, about 2000). Throughout the document, it is contemplated that embodiments permit supporting an unlimited number of custom objects per tenant or, in other words, within the context of a tenant, an unlimited number of tables are supported. Further, in one embodiment, lightweight objects may help load metadata "on the fly" along with actual data to avoid caching massive amounts of metadata to describe a rather large number of object types, while hiding the metadata from administrative views to avoid displaying too much clutter. Dynamic objects mechanism 110 may support this proliferation of object types by, for example, storing type IDs along with record IDs in the index as well as expanding the maximum size for a search bucket Id and further, allowing new lightweight objects to be sharable with the existing default objects in a private sharing model. The use of the term "lightweight", "tables", "my custom object" or "MCO" should not be read to limit embodiments to objects that carry that label in products or in literature external to this document. Terms like "objects" and "entities" may be used interchangeably throughout this document.

It is contemplated that an administrative user typically includes an authorized and/or trained user, such as a system administrator, a software developer, a computer programmer, etc. In contrast, an end-user may be any user that can access a client computing device, such as via a software application or an Internet browser. In light of this and in one embodiment, lightweight "tables" or "MCOs" differ from administered objects in that any number and type of tables/MCOs can be created per tenant or within a single tenant by end-users or non-administrative users, while conventional custom objects may only be created by administrative users and are limited to a particular amount, such as 2000 objects per tenant. Standard custom objects may be part of a service provider's default offering for all its customers (although some licensing restrictions may apply).

Dynamic object definitions may be stored in a standard_entity_data table, while, in contrast, custom entity definitions may be stored in a custom_entity_definition table. Any fields that are dynamically added to each dynamic object may be based on the fields in the imported file. For example, a user, via client computing device 240, may access any number of MCOs (e.g., 65,536 MCOs) since each dynamic object entity may not have a unique key prefix that is stored in database 225. Entity IDs for each loaded dynamic object may be dynamically calculated when dynamic objects are loaded from database 225 for a specific user. These calculated IDs may not be saved at database 225. For example, there may be a unique 0U0 ID for each dynamic object that is stored in the standard_entity_data_id column within the standard_entity_data table. This allows a user to uniquely refer to an MCO from a feeds item, etc.

In one embodiment, a user, via user interface 244 provided through client-based application 242 at client computing device 240, may generate dynamic objects (and may use them with administered objects) to manipulate and view data and related metadata in a particular format (e.g., table, etc.) as desired or necessitated by the user. Examples of users may include, but are not limited to, customers, such as organizational customers (e.g., small and large businesses, companies, corporations, academic institutions, government agencies, non-profit organization, etc.) of a service provider (e.g., Salesforece.com) and/or individual customers, such as individuals or end-users, of the organization customers. It is to be noted that terms like "user", "customer", "organization", "business", "company", etc., may be used interchangeably throughout this document.

For example and in one embodiment, dynamic objects may differ from administered custom objects in several ways, such as dynamic objects may (1) have virtually unlimited key space, they are (2) not residual in memory, (3) not cached, and (4) are considered user data. With regard to unlimited key space, for example, administered objects may have a keyspace of roughly, for example, 4000, so any database tenant may have only 4000 objects defined (or even limited to 2000). The administered object limit of 2000, for example, may be due to the limited reserved area of memory in the residual memory which holds these administered custom objects. Dynamic object-based tables may have a virtually unlimited keyspace (such as, not limited to, in the billions), so instead of two character designation, they may have a full 15 character ID, which means a virtually unlimited number of dynamic objects may be given to any given tenant. Further, dynamic objects, in one embodiment, are transient and thus, for each request, additional memory is created and then released at the end of the request. Using this technique, no restrictions or limits are imposed on the newly-created dynamic objects.

Additionally, in on embodiment, any metadata for dynamic objects is not cached and instead, the metadata is fetched along with the corresponding data whenever a request is placed or received. Without having to continuously cache metadata, a potentially unlimited number of dynamic objects may be created. With regard to user data, setup data is distinguished from non-setup or user data, such as administered objects, user profiles, etc., may be considered setup data, while accounts, leads, opportunities, etc., are considered non-setup or user data. Similarly, table definitions may be considered user data to be distinguished from any other metadata.

In one embodiment, dynamic objects mechanism 110 may be employed at a server computing system, such as computing device 100 of FIG. 1, and may be in communication with one or more client computing devices, such as client computing device 240, over a network, such as network 230 (e.g., a cloud-based network, the Internet, etc.). As aforementioned, a user may include an organization or organizational customer, such as a company, a business, etc., that is a customer to a provider (e.g., Salesforce.com) that provides access to dynamic objects mechanism 110 (such as via client computer 240). Similarly, a user may further include an individual or a small business, etc., that is a customer of the organization/organizational customer and accesses dynamic objects mechanism 110 via another client computing device. Client computing device 240 may be the same as or similar to computing device 100 of FIG. 1 and include a mobile computing device (e.g., smartphones, tablet computers, etc.) or larger computers (e.g., desktop computers, server computers, etc.).

In one embodiment, dynamic objects mechanism 110 facilitates generation and use of dynamic objects (e.g., lightweight objects) along with administered objects to allow the user to manipulate, share, and present data/metadata any number of products, such as databases, social/business network websites, etc. For example, the technique may be applied to any number and type of social and business networking products, such as Chatter® by Salesforce.com, Facebook®, LinkedIn®, etc. Further, for example, using dynamic objects, instead of separately emailing a spreadsheet to each member of a group (e.g., accounting depart) of a company or organization, a member may choose to share data using a spreadsheet in a particular format (e.g., Excel® by Microsoft®, Numbers® by Apple®) on a business networking website (e.g., Chatter, etc.) with all or some members of the group even if the networking website does not typically support spreadsheets or particular forms of spreadsheets. In one embodiment, this is achieved by using dynamic objects mechanism 110 to generate the necessary number and type of dynamic objects (that support the spreadsheet) to work with the administered objects (already supported by the website) so that the spreadsheet may be shared and displayed on the website. It is contemplated that embodiments are not limited to any particular product, software application, website, such as Chatter, LinkedIn, Facebook, etc., just as the data/metadata is not limited to any particular product/format, such as spreadsheets (e.g., Excel, Numbers, etc.), word processing applications (e.g., Word® by Microsoft, Pages® by Apple, etc.), presentation applications (e.g., PowerPoint® by Microsoft, Keynote® by Apple, etc.), browsers (e.g., Explorer® by Microsoft, Safari® by Apple, etc.), etc.

In the illustrated embodiment, dynamic objects mechanism 110 may include various components, such as authentication logic 202, request reception logic 204, processing logic 206 (including detection module 208 having scanner 209, decision module 210, creation module 212, import module 214, conversion module 216), reporting logic 218, communication/access logic 220, and compatibility logic 222. Dynamic objects mechanism 110 is in communication with database 225 to store data and metadata relating to administered and dynamic objects. Object mechanism 110 is further in communication with any number and type of client computing devices, such as client computing device 240 over network 230. Throughout this document, the term "logic" may be interchangeably referred to as "component" or "module" and may include, by way of example, software, hardware, and/or any combination of software and hardware, such as firmware. This combination of components provided through dynamic objects mechanism 110 facilitates user-based control and manipulation of particular data products/software applications (e.g., social websites, business websites, word processing, spreadsheets, database products, etc.) to be manipulated, shared, communicated, and displayed in any number and type of formats as desired or necessitated by user and communicated through user interface 244 at client computing device 240 and over network 230.

In one embodiment, authentication logic 202 may be used to authenticate a user/customer and/or computing device 240 before the user is allowed to access and use dynamic objects mechanism 110. It is contemplated that in some embodiments, the authentication process may be a one-time process conducted when computing device 240 is first allowed access to dynamic objects mechanism 110 or, in some embodiments, authentication may be a recurring process that is performed each time a request for creating and/or using a dynamic object (is placed via computing device 240 and further via user interface 244) is received by request reception logic 204 at components mechanism 110 at the cloud-based server computer over network 230.

Once the request to generate one or more dynamic objects is received at request reception logic 204, it is then sent to processing logic 206 for processing so that the dynamic objects may be generated and properly applied. For example, placing or receiving a request for creating dynamic objects may include having a user (e.g., accounting manager at a company, etc.) place a request to share data/metadata (e.g., company annual report) with other individuals at the company (e.g., accounting group, Central Financial Officer (CFO), etc.) using a software product (e.g., Excel spreadsheet) that is not supported by a website or business application (e.g., Chatter). In other words, for example, when a user requests a particular format or product to share, communicate, display or use data/metadata on a business application/website, the request may be interpreted as a request to generate a necessary set of dynamic objects so that the requested format may be supported by the business application/website, which is not typically supported by the administered objects of that business application/website. It is contemplated that the newly-generated set of dynamic objects may work with any administered objects to accomplish the aforementioned task of using the particular format or product.

In one embodiment, detection module 208 may be used to review the request to determine the requested data types (e.g., dates, numbers, text, etc.) within the request so that a determination may be made as to whether the requested data types may be supported or provided in database 225 or imported. Detection module 208 may include scanner 208 to not only scan various parts of the request, but also to scan any data/metadata for data types when the data/metadata is uploaded from database 225. Database 225 may be accessed by and its uploading may be triggered using communication/access logic 220. In one embodiment, once detection and the subsequent scanning is completed by detection module 208 and its scanner 209, decision module 210 determines and decides whether the requested data types are available or may be imported and that any necessary dynamic objects may be created to support the requested data types to facilitate the user-requested format/product.

Upon determining that the relevant data types for the requested format are accessible, the corresponding dynamic objects may be created using creation module 212. The newly-created dynamic objects may then be used with any custom objects to satisfy the user request for the particular format. In one embodiment, import module 214 may be used to important any number of entities, such as data types, data, metadata, objects, etc. This importation may be local, such as import module 214 may work with communication/access logic 220 to obtain any number and type of entities from database 225, such as accessing an entity (e.g., data) directly from database 225 or through another entity, such as through a report (e.g., metadata relating to the data from a report), etc., residing at database 225. The importation may be remote, such as obtaining any number and type of entities from any number and type of remote sources, such as another database or server computer, etc., in communication with the computing device employing dynamic objects mechanism 110 over network 230.

Further, conversion module 216 may be used to perform various types of conversions, such as converting one data type to another (e.g., from text to number, etc.), converting formats, converting objects, etc. Dynamic objects mechanism 110 further includes reporting logic 218 to facilitate reporting-related tasks, such as generating reports (e.g., default reports, customized reports, etc.), copying reports, deleting reports, amending reports, etc. Compatibility logic 222 allows for dynamic objects mechanism 110 to work with any number and types of data types, software products, client computing devices 240, networks 230, and the like.

It is contemplated that any number and type of components may be added to and/or removed from dynamic objects mechanism 110 to facilitate various embodiments including adding, removing, and/or enhancing certain features. For brevity, clarity, and ease of understanding of dynamic objects mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
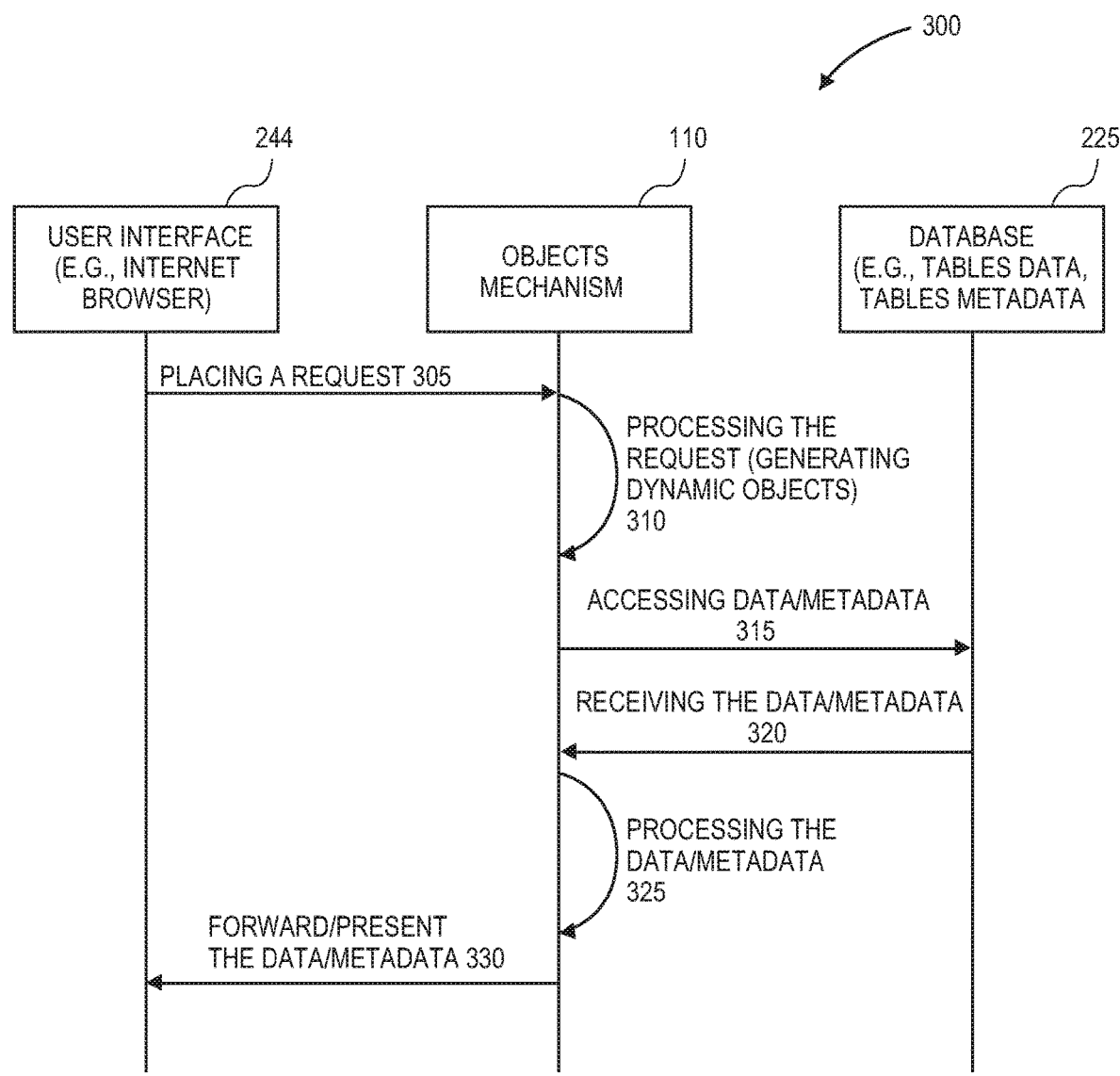
FIG. 3 illustrates a transaction sequence for facilitating management and customization of lightweight objects according to one embodiment.

FIG. 3 illustrates a transaction sequence 300 for facilitating management and customization of lightweight objects according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by dynamic objects mechanism 110 of FIG. 1.

In the illustrated embodiment, transaction sequence 300 begins with a user accessing a user interface 244 (e.g., an Internet browser, such as Explorer, Safari, etc.) at a client computing device for placing a request 305 for data any associated metadata (e.g., accounting report having the data/metadata) to be provided in a specific format (e.g., Excel, Word, etc.) using a software product (e.g., Chatter, Facebook, etc.). The request is received and processed 310 at objects mechanism 110 employed at a server computing device that is in communication with the client computing device over a network (e.g., cloud-based network, the Internet, etc.). The processing of the request may include generating new dynamic lightweight objects if the default or administered objects provided by the service provider (e.g., owner/provider of the software product, such as Salesforce.com providing Chatter) do not support the requested format.

Upon processing the request and generating the new dynamic objects, the requested data/metadata (including associated data types) is accessed 315 from database 225 (maintain Table data, Table metadata, etc.). The requested data/metadata is received 320 from database 225. The data/metadata is processed 325 so it may be provided in the request format and upon processing, the data/metadata is provided in the requested format 330, such as sharing an accounting spreadsheet in Excel format with various members of an accounting group by posting the spreadsheet using the software product (such as on Chatter, Facebook, etc.).

Figure 4:
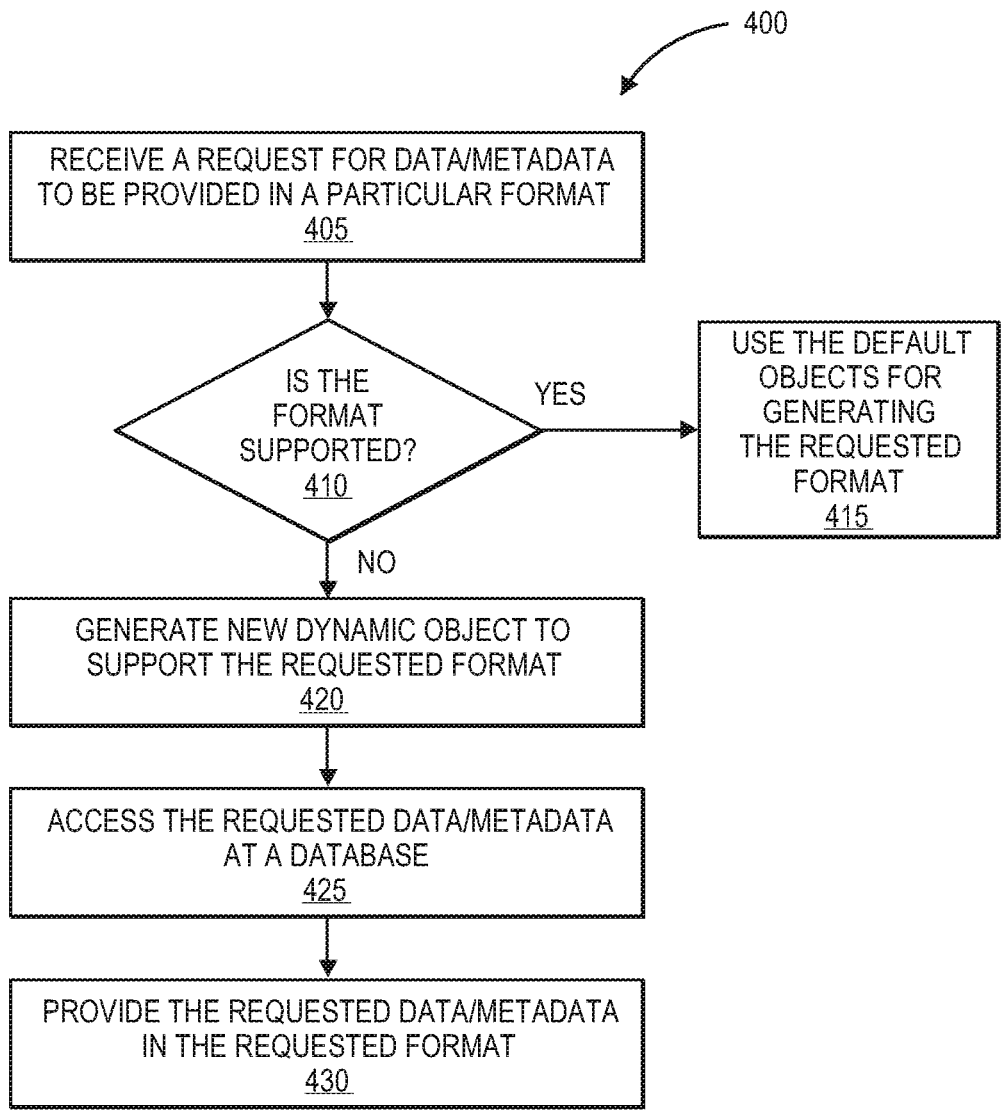
FIG. 4 illustrates a method for facilitating management and customization of lightweight objects according to one embodiment.

FIG. 4 illustrates a method 400 for facilitating management and customization of lightweight objects according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by dynamic objects mechanism 110 of FIG. 1.

Method 400 begins with receiving a request, at block 405, placed by a user by accessing a user interface (e.g., an Internet browser, such as Explorer, Safari, etc.) at a client computing device for data and any associated metadata (e.g., accounting report having the data/metadata) to be provided in a specific format (e.g., Excel, Word, etc.) using a software product/website (e.g., Chatter, Facebook, etc.). The request is received and processed at objects mechanism 110 of FIG. 1 that may be employed at a server computing device that is in communication with the client computing device over a network (e.g., cloud-based network, the Internet, etc.). The processing of the request may include generating new dynamic lightweight objects if the default or administered objects provided by the service provider (e.g., owner/provider of the software product, such as Salesforce.com providing Chatter) do not support the requested format.

At block 410, a determination is made as to whether the requested format is supported by the administered objects of the service provider. If yes, at block 415, the process continues with using the relevant default or administered objects for generating the requested format. At block 425, the process further continues with accessing the requested data/metadata from a local or remote database in communication with the server computing device so that the data/metadata may be put into the requested format and provided to the user at the client computing device. At block 430, the requested data/metadata is provided via the requested format using the administered objects. As aforementioned, the providing of the data/metadata may include, but is not limited to, posting or sharing a file (having the data/metadata) on the requested software product/website via the requested format.

Referring back to block 410, if the administered objects do not support the requested format, dynamic lightweight objects are generated at block 420. At block 425, the requested data/metadata is accessed at the database. The newly-generated lightweight objects are used to generate the requested format so that the requested data/metadata may be provided in the requested format. It is contemplated that to achieve the task of supporting the requested format, certain default/administered objects may also be used or employed to provide default functionalities for which there may not be any need to generate new objects. At block 430, the requested data/metadata is provided via the requested format.

Figure 8:
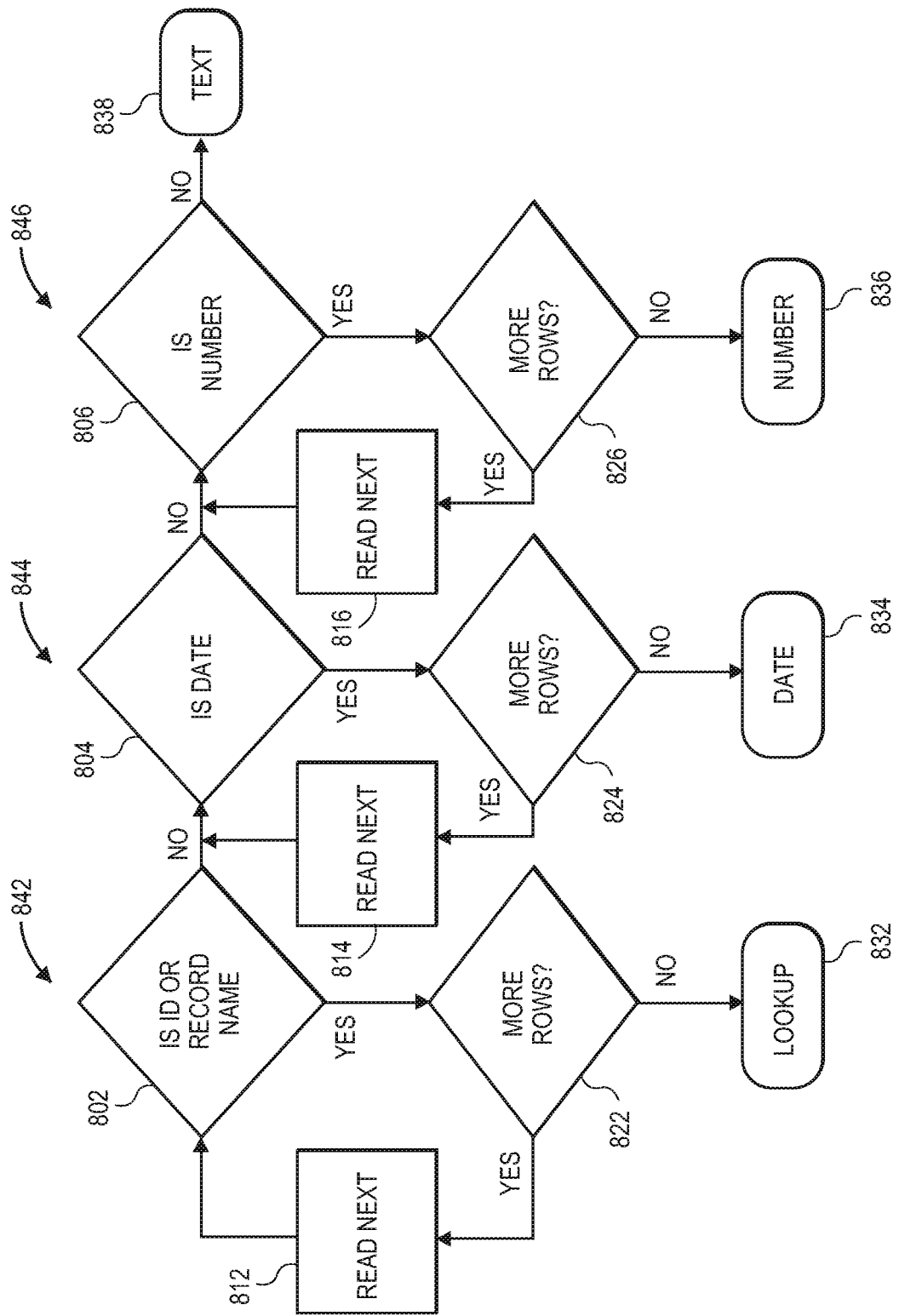
FIG. 8 illustrates detecting and evaluating a data type in an input data file for generating relevant lightweight dynamic custom objects according to one embodiment.

Referring to FIG. 8, it illustrates detecting and evaluating a data type in an input data file for generating relevant lightweight dynamic custom objects according to one embodiment. In the illustrated embodiment, when an input data file is uploaded from a database, such as database 225 of FIG. 2, detection module 208 (scanner 209) is triggered to detect the various data types 832-838 in columns 842-846 of the uploaded file. For example, data types may include, but are not limited to, lookup 832, date 834, number 836, text 838 (serving as the default data type), etc. In one embodiment, columns 842-846 of the data may be scanned, via scanner 209, to determine or detect the various data types 832-838.

For example and as illustrated, at block 802, column 842 is scanned to determine whether the data type of column 842 is an ID or a record name. If yes, at block 822, a determination is made as to whether there are any additional rows so they may also be similarly checked. If there are no more rows, the data type is classified or interpreted as lookup 832. At block 822. If there are additional rows, the process continues with reading the additional rows at block 812, followed by a determination of the data type classification at block 802. If, at block 802, for any row, it is determined that the data type is neither an ID nor a record name, the process continues at the next column 844 with decision block 804 with another determination.

At block 804, a determination is made as to whether the data type is a date. If yes, at block 824, a determination is made as to whether there are any additional rows to be evaluated. If not, the data type is classified as date 834. If there are additional rows, the process continues with reading the next row and any subsequent rows at block 814 and then moves on to perform another determination at block 804 as to whether the data type of these additional rows is a date. If not, the process continues with the next column 846 with another determination at block 806.

At block 806, a determination is made as to whether the data type is a number. If yes, at block 826, a determination is made as to whether there are any additional rows to be evaluated. If not, the data type is classified as number 836. If there are additional rows, the process continues with reading the next row and any subsequent rows at block 816 and then moves on to perform another determination at block 806 as to whether the data type of these additional rows is a number. If not, the process continues with classifying the data type as text 838, which serves as a default data type.

In one embodiment, dynamic lightweight custom objects may be instantiated from the input data containing any number of columns 842-846 and rows. In one embodiment, detection module 208 in combination with scanner 209 my detect data types 832-838 by scanning or inspecting columns 842-846 to determine whether they fit into a particular data type, such as relationship/lookup 832, date 834, number 836, text 838, etc. Once a data type 832-838 for each column 842-846 has been identified, dynamic objects mechanism 110 of FIG. 1 generates the corresponding dynamic lightweight objects using strongly-typed fields based on the input data. Further, a user interface may be used for uploading the data into the newly-generated dynamic objects and it is contemplated that multiple input data types and locales (e.g., CVS, TSV, XLS, etc.) may be supported. Additionally, source file formats may be parsed to determine field types, while data may be imported in a bulk insert.

In one embodiment, detection module 208 (scanner 209) of FIG. 2 may be used to keep trace of whether a dynamic object is available for use, is in progress, has failed, etc., and to surface that information in the UI. In some embodiments, an ENUM field may be added to a dynamic object entity. These values may include: (1) NEW, which is set to the record or entity when the corresponding dynamic object is newly created, while the corresponding dynamic object record may be created in the same transaction as the enqueue event; (2) IN PROGRESS, which may be the first thing a message queue handler may do when dequeueing a message is to set the dynamic object status to IN PROGRESS and commit that change (e.g., using a second connection, if necessary); (3) FAILED may be set when there has been an irreconcilable error after a number of attempts (e.g., 3 or 4 attempts, etc.) have been made; and (4) SUCCESS may be set after a queue message has been processed and the relevant data has been imported in a table (e.g., core.my_entity_data).

Figure 9A:
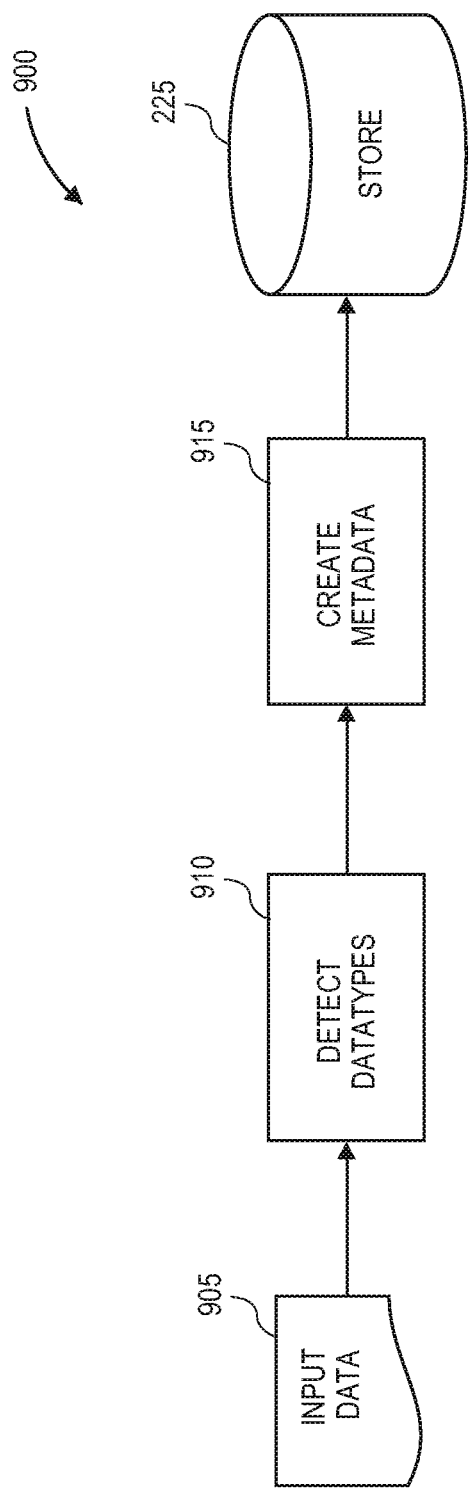
FIGS. 9A and 9B illustrate processes in accordance with FIG. 8 according to one embodiment.
Figure 9B:
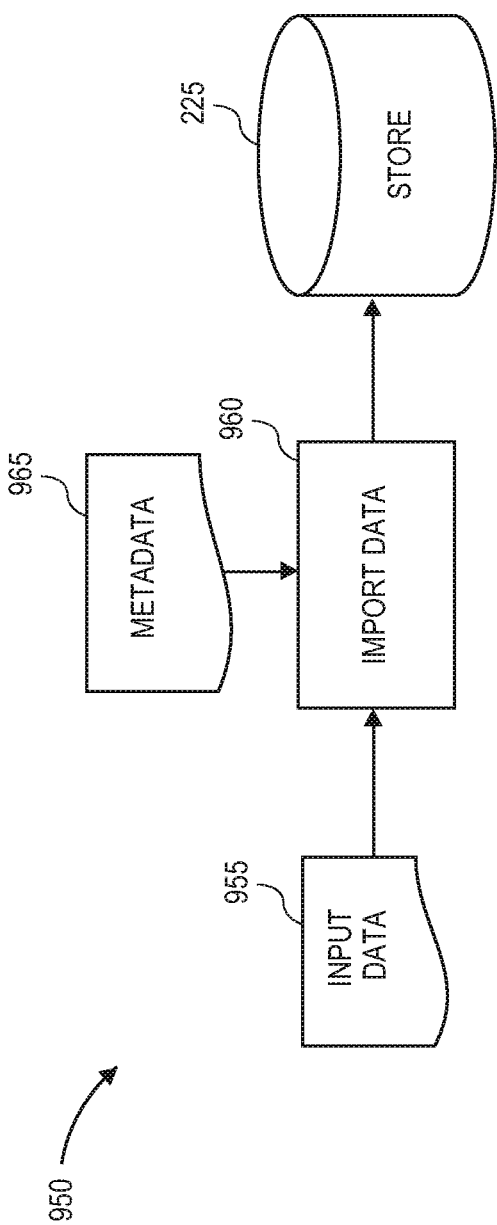

FIGS. 9A and 9B illustrate processes 900, 950 in accordance with FIG. 8 according to one embodiment. FIG. 9A illustrates a process 900 that begins with obtaining data by uploading an input data file 905. It is contemplated that in some embodiments, the input data may not be uploaded and instead, it may be obtained from an existing data report stored within the system, such as at a database. For example, reports may have an export to cvs process that may be leveraged to create the input data. In one embodiment, once the input data 905 has been uploaded, various data types are detected and classified at block 910 as described with reference to FIG. 8. Upon detection of the data types and their corresponding classifications, metadata associated with the data is created at block 915. The data and associated metadata are stored at database 225. The process of metadata creation may include generating a set of dynamic lightweight objects based on the data types classifications.

FIG. 9B illustrates a process 950 that beings with obtaining data by uploading an input data file 905, while metadata 965 is appended or imported, at block 960, having newly-generated dynamic lightweight objects that is then stored at database 225. The data/metadata import, at block 960, may be performed using import module 214 of FIG. 2.

In one embodiment, import module 214 of FIG. 2 may facilitate import of input data files 955, while further facilitating a validation process for validate the imported and other input data files 905, 955, performing an automatic data type check, etc. Data files 955 may be imported synchronously or asynchronously based on any number of factors, such as file size, import results, e-mail messages, etc. In one embodiment, the process may include determining the size of data within a data file 955 to be imported as an object (e.g., dynamic lightweight object), uploading the set of data based on the size of the data, and if the size is small, the uploading process may be performed synchronously, while if the size is large, the uploading process may be performed asynchronously.

In some embodiments, a user, via a user interface at a computing device, such as user interface 244 at computing device 240 of FIG. 2, may automatically create a new table based on contents of an input file 905, 955. Alternatively, in some embodiments, the user may be allowed to create a table from scratch, such as similar to the process of importing data, at block 960, by, for example, having define contents and scope of the table (without having the necessity for employing the imported data evaluation process). The process may include prompting a user, via a user interface at a computing device, such as user interface 244 at computing device 240 of FIG. 2, for a providing a table definition for generating a table. The user's provided definition is received as a request at request reception logic 204 of FIG. 2, while the request is processed by dynamic objects mechanism 110 and the table is generated based on the table definition.

In some embodiments, a user, via a user interface at a computing device, such as user interface 244 at computing device 240 of FIG. 2, may automatically create a new table based on contents of an input file 905, 955, while the table may be created from a report, such as based on a report's definition and the underlying queried data. Further, in one embodiment, the report's metadata and the queried data may be transformed into a physical table that includes the report data. The transformation may be performed by, for example, parsing the report to identify columns and/or other subsets of the report data and then, automatically, defining column names with their correct data types, correct names, etc., while the report data may be automatically imported in to table. The table may then be provided to the user in response to the request placed by the user, such as by displaying the table via a software application, such as a social or business network website (e.g., Chatter, Facebook, etc.). For example, the process may include receiving a report at an on-demand services database, parsing the report into subsets of data, and generating a table based on the subsets of the data.

Furthermore, in one embodiment, a user may be allowed to upsert (e.g., upload and/or insert) data into an existing table; for example, if an Excel file is used to create dynamic lightweight objects, dynamic objects mechanism 110 of FIG. 1 may facilitate the user the ability to upsert the same file (or other files, data from external data sources, etc.) in the same table. For example and in one embodiment, the process may include receiving a data file to upsert into a dynamic lightweight object of an on-demand services database, and upserting contents of the data file into the dynamic lightweight object.

Figure 5:
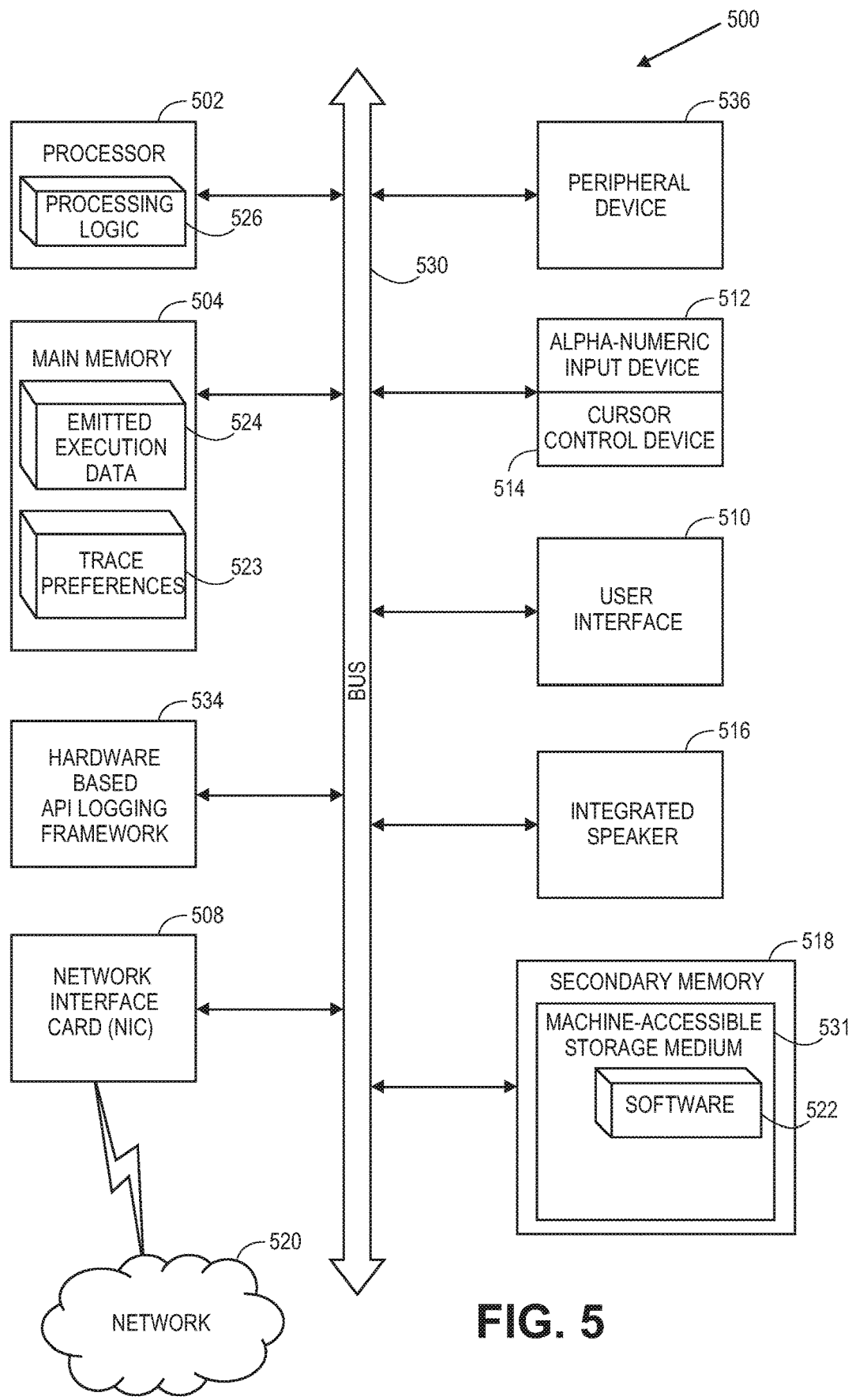
FIG. 5 illustrates a computer system according to one embodiment.

Referring now to FIG. 5, it illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 240 of FIG. 1 and FIG. 2, respectively. In alternative embodiments, the machine may be connected (e.g., networked) to other machines in a network (such as host machine 100 of FIG. 1 connected with client machine 240 of FIG. 2 over network 230), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic objects mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic objects mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
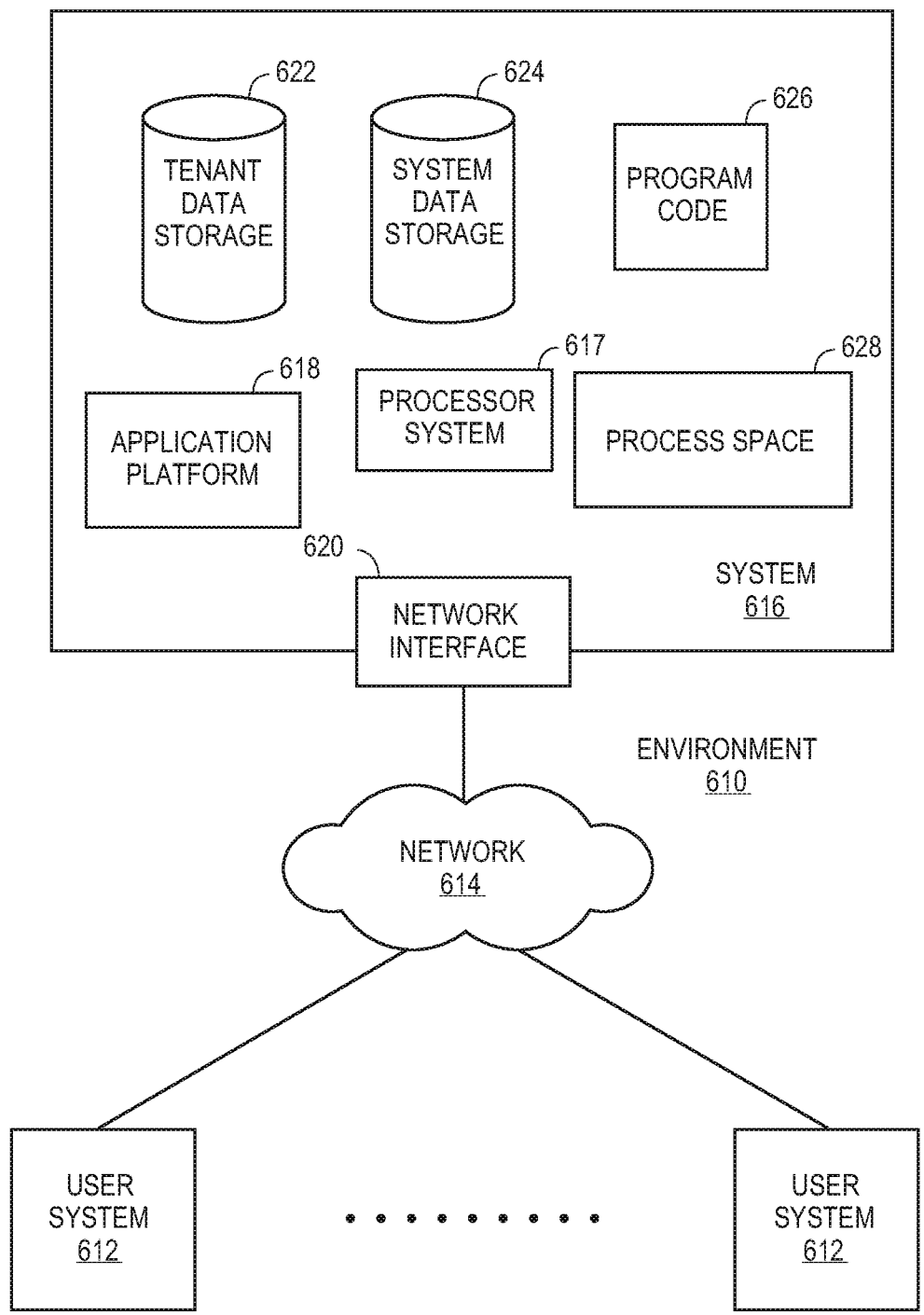
FIG. 6 illustrates a block diagram of an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
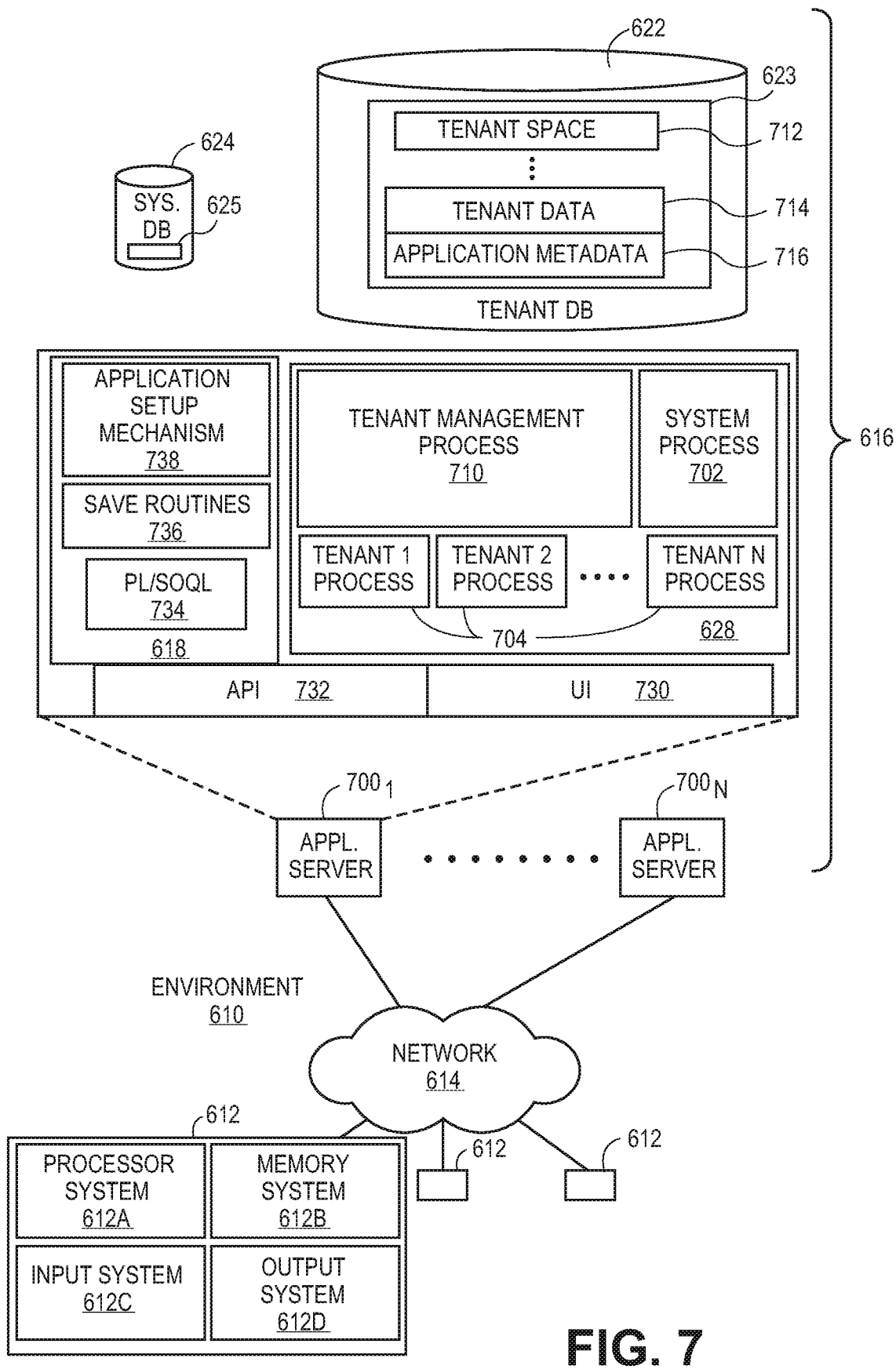
FIG. 7 illustrates a block diagram of an embodiment of elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

It is to be understood that the above description is intended to be illustrative, and not restrictive.

What is claimed is:

1. A method comprising:
uploading, by a product customization server device, in response to a request, a data file having data associated with a tenant in a multi-tenant database system, wherein the request identifies a default product for customization and includes one or more customization preferences of the tenant;
detecting, by the product customization server device, data types relating to the data, wherein detecting includes scanning data rows and data columns of the data file;
classifying, by the product customization server device, the detected data types into one or more categories based on the one or more customization preferences of the tenant;
creating, by the product customization server device, one or more dynamic objects based on the detected data types and the one or more categories; and
configuring, by the product customization server device, the default product into a customized product accessible to the tenant by associating the one or more dynamic objects to the default product.

2. The method of claim 1, further comprising:
receiving, at the product customization server device, the request for the data file having the data and associated metadata to be provided in a format that is not supported by default objects of a software application;
generating, by the product customization server device, the requested format using the one or more dynamic objects; and
providing, by the product customization server device, the data file in the requested format via the software application.

3. The method of claim 2, wherein the request is placed, via a user interface, at a client computing device having a mobile computing device, wherein the request is placed by a user as an individual or serving as a representative of an organization, wherein the organization includes a customer of a service provider that is an owner or provider of the software application.

4. The method of claim 3, wherein the software application comprises one or more of a business software application, a business networking website, and a social networking website.

5. The method of claim 1, wherein the product customization server device is coupled to the client computing device over a network, wherein the network includes one or more of a cloud-based network, a Local Area Network (LAN), a Wide Area Network (WAN), a Metropolitan Area Network (MAN), a Personal Area Network (PAN), an intranet, an extranet, or the Internet.

6. The method of claim 1, further comprising:
authenticating, in real-time, by the product customization server device, the request prior to processing the request; and
determining, by the product customization server device, whether the request format is supported by default objects of the software application, prior to generating the one or more dynamic objects.

7. The method of claim 2, wherein the format is compatible with one or more of a word processing application, a spreadsheet application, and a presentation application, a database application, and wherein the file comprises one or more of a word processing file, a spreadsheet file, a presentation file, and a database file.

8. The method of claim 2, further comprising accessing, by the product customization server device, the data and the associated metadata stored at a database, wherein the database is coupled to the first computing device.

9. The method of claim 1, wherein providing the data file comprises displaying or sharing the data file via the software application via the user interface including an Internet browser, and wherein providing the file further comprises generating a report relating to the data file, and wherein the report is displayed or shared via the software application via the user interface.

10. A system comprising:
a product customization server device having a memory to store instructions, and a processing device coupled to the memory, the processing device to execute the instructions to:
upload, in response to a request, a data file having data associated with a tenant in a multi-tenant database system, wherein the request identifies a default product for customization and includes one or more customization preferences of the tenant;
detect data types relating to the data, wherein detecting includes scanning data rows and data columns of the data file;
classify the detected data types into one or more categories based on the one or more customization preferences of the tenant;
create one or more dynamic objects based on the detected data types and the one or more categories; and
configuring the default product into a customized product accessible to the tenant by associating the one or more dynamic objects to the default product.

11. The system of claim 10, wherein the processing device is further to:
receive the request for the data file having the data and associated metadata to be provided in a format that is not supported by default objects of a software application;
generate the requested format using the one or more dynamic objects; and
provide the data file in the requested format via the software application.

12. The system of claim 11, wherein the request is placed, via a user interface, at a client computing device having a mobile computing device, wherein the request is placed by a user as an individual or serving as a representative of an organization, wherein the organization includes a customer of a service provider that is an owner or provider of the software application.

13. The system, of claim 12, wherein the software application comprises one or more of a business software application, a business networking website, and a social networking website.

14. The system of claim 10, wherein the product customization server device comprises is coupled to the client computing device over a network, wherein the network includes one or more of a cloud-based network, a Local Area Network (LAN), a Wide Area Network (WAN), a Metropolitan Area Network (MAN), a Personal Area Network (PAN), an intranet, an extranet, or the Internet.

15. The system of claim 10, wherein the processing device is further to:
authenticate, in real-time, the request prior to processing the request; and determine whether the request format is supported by default objects of the software application, prior to generating the one or more dynamic objects.

16. A non-transitory machine-readable medium having stored thereon instructions which, when executed by a machine, cause the machine to:
   upload, in response to a request, a data file having data associated with a tenant in a multi-tenant database system, wherein the request identifies a default product for customization and includes one or more customization preferences of the tenant;
   detect data types relating to the data, wherein detecting includes scanning data rows and data columns of the data file;
   classify the detected data types into one or more categories based on the one or more customization preferences of the tenant;
   create one or more dynamic objects based on the detected data types and the one or more categories; and
   configuring the default product into a customized product accessible to the tenant by associating the one or more dynamic objects to the default product.

17. The non-transitory machine-readable medium of claim 16, wherein the machine is further to:
   receive the request for the data file having the data and associated metadata to be provided in a format that is not supported by default objects of a software application;
   generate the requested format using the one or more dynamic objects; and
   provide the data file in the requested format via the software application.

18. The non-transitory machine-readable medium of claim 17, wherein the request is placed, via a user interface, at a client computing device having a mobile computing device, wherein the request is placed by a user as an individual or serving as a representative of an organization, wherein the organization includes a customer of a service provider that is an owner or provider of the software application.

19. The non-transitory machine-readable medium of claim 18, wherein the software application comprises one or more of a business software application, a business networking website, and a social networking website, wherein the product customization server device is coupled to the client computing device over a network, wherein the network includes one or more of a cloud-based network, a Local Area Network (LAN), a Wide Area Network (WAN), a Metropolitan Area Network (MAN), a Personal Area Network (PAN), an intranet, an extranet, or the Internet.

20. The non-transitory machine-readable medium of claim 16, wherein the machine is further to:
   authenticate, in real-time, the request prior to processing the request; and
   determine whether the request format is supported by default objects of the software application, prior to generating the one or more dynamic objects.

\* \* \* \* \*